(12) United States Patent
Sankaralingam (10) Patent No.: US 7,694,266 B1
(45) Date of Patent: Apr. 6, 2010

(54) METHOD AND APPARATUS FOR DYNAMIC FREQUENCY VOLTAGE SWITCHING CIRCUIT SYNTHESIS

(75) Inventor: Ranganathan Sankaralingam, Fremont, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 254 days.

(21) Appl. No.: 12/017,624

(22) Filed: Jan. 22, 2008

(51) Int. Cl.
*G06F 17/50* (2006.01)

(52) U.S. Cl. .................. 716/18; 716/4; 716/5; 716/6; 327/291

(58) Field of Classification Search .............. 716/4–6, 716/18; 327/291
See application file for complete search history.

(56) References Cited

U.S. PATENT DOCUMENTS

| | | | |
|---|---|---|---|
| 6,515,530 B1 * | 2/2003 | Boerstler et al. | 327/291 |
| 6,567,957 B1 * | 5/2003 | Chang et al. | 716/4 |
| 6,779,163 B2 | 8/2004 | Bednar et al. | |
| 6,820,240 B2 | 11/2004 | Bednar et al. | |
| 6,883,152 B2 | 4/2005 | Bednar et al. | |
| 7,228,242 B2 * | 6/2007 | Read et al. | 702/57 |
| 7,530,047 B2 * | 5/2009 | Wang et al. | 716/18 |
| 2007/0083832 A1 * | 4/2007 | Orshansky et al. | 716/2 |
| 2007/0234091 A1 * | 10/2007 | Vishin et al. | 713/322 |
| 2007/0245285 A1 * | 10/2007 | Wang et al. | 716/10 |
| 2008/0005707 A1 * | 1/2008 | Papanikolaou et al. | 716/4 |
| 2008/0126999 A1 * | 5/2008 | Wang | 716/2 |
| 2008/0127014 A1 * | 5/2008 | Pandey et al. | 716/5 |
| 2008/0301598 A1 * | 12/2008 | Gangadharan et al. | 716/5 |
| 2008/0307240 A1 * | 12/2008 | Dahan et al. | 713/320 |
| 2009/0048801 A1 * | 2/2009 | Chandra | 702/120 |
| 2009/0089725 A1 * | 4/2009 | Khan | 716/5 |
| 2009/0115469 A1 * | 5/2009 | Cortadella et al. | 327/142 |

* cited by examiner

*Primary Examiner*—Naum B Levin
(74) *Attorney, Agent, or Firm*—Duane Morris LLP (57) ABSTRACT

Methods and apparatus provide for automated synthesis of an integrated circuit whose voltage is varied during operation (also known as dynamic voltage and frequency scaling or DVFS). The automation may include estimating technology parameters from timing libraries, and determining a translation factor that can be used in estimating path delays for an arbitrary voltage from path delays at another voltage. The automation may also include estimating a relative difficulty to synthesize a design for meeting sets of timing constraints specified at different operating voltages and frequencies by assigning one of the constraints a common base value among all the sets, translating the other constraint to maintain equivalency of synthesis difficulty, comparing the resulting equivalent constraints to identify a hardest-to-synthesis constraint set, and using that constraint set as a goal for a first synthesis of the circuit.

24 Claims, 3 Drawing Sheets

FIG. 1

Receive constraints for operating modes of circuit to synthesize
201

↓

Select constraint type as base constraint type
205

↓

Select base constraint value
210

↓

Translate other constraints for each mode while maintaining equivalency
215

↓ 251

Using translated constraints, identify mode providing first constraints for synthesis
220

↓ 252

Synthesize circuit using constraints of identified mode
225

Sort modes based on translated constraint
305

↓

Select hardest to synthesize mode based on translated constraints
310

METHOD AND APPARATUS FOR DYNAMIC FREQUENCY VOLTAGE SWITCHING CIRCUIT SYNTHESIS

BACKGROUND

1. Field

The present invention generally relates to synthesis of circuits and more specifically to synthesis of circuits that can operate at multiple frequencies and voltage levels.

2. Description of Related Art

Design of integrated circuits can involve using automated synthesis tools for determining a design and placement of circuitry to implement functions specified by a functional specification. Often, a synthesis tool will use building blocks, such as certain pre-defined logic assemblies, that have been characterized and are contained in a library. In many cases, such a library has been designed in view of certain process parameters, such as minimum feature size.

It is known that circuits and portions of circuits are designed with the expectation that they perform at certain clock rates, or otherwise can produce an output within a required time of receiving a triggering input. As such, circuits are synthesized and modified toward the view of meeting such timing requirements across a functional block being synthesized, or some other portion of a circuit, a circuit, or a chip, etc.

Power consumption of electronics has become an important issue. One way to reduce power consumption of a circuit is to reduce its operating voltage. However, it is generally true that a given circuit operates more slowly as its voltage is lowered (if it works at all). Slower operation usually correlates to lower performance. Thus, it is frequently a goal of integrated circuit design to be able to design circuits that can operate across a variety of voltage levels, which can be varied during operation such that an appropriate voltage setting can be selected for a level of performance. Circuit designs (e.g., for programmable or dedicated processors) that can select an operating frequency and voltage pair from among a number of frequency/voltage operating pairs may be described as Dynamic Voltage Frequency Scaling (DVFS) designs.

Improved methods for setting constraints during synthesis of DVFS designs is desirable.

SUMMARY

In one aspect, a method useful in synthesis of an integrated circuit to be operational at a plurality of different voltages and frequencies includes steps of receiving a constraint set for each mode at which a circuit to be synthesized is expected to be operable. Each constraint set includes a voltage and a frequency corresponding to that voltage. The method also includes selecting a voltage as a base mode voltage, translating frequencies corresponding to voltages different from the base mode voltage into equivalent frequencies, each corresponding to the base mode voltage, and indicative of the relative difficulty to synthesize the circuit to be operable within each constraint set. The method also includes selecting a constraint set for use in a first synthesis of the circuit, based at least in part on the equivalent frequencies.

In another aspect, a method comprises useful in synthesis of multimode integrated circuits comprises identifying a first mode and a second mode for operation of an integrated circuit, each of the first mode and the second mode specified by a respective original constraint set comprising at least a first constraint with an original value and a second constraint with an original value. The method also comprises determining a first constraint base value. Also, the method comprises, for each of the first and second modes with an original first constraint value different from the base value, determining a value for a respective second constraint equivalent that approximately represents, with respect to the first constraint base value, a synthesis constraint equivalent to that provided by the original values of the first constraint and the second constraint for that mode.

In still other aspects, a method for synthesis of multimode circuits comprises receiving sets of constraints for a plurality of operating modes, at which an integrated circuit to be synthesized is to operate. Each constraint set includes an operating voltage and a maximum path delay. The method also comprises selecting one of the operating voltages as a base mode voltage and translating the maximum path delays of any of the other constraint sets having a voltage different from the base mode voltage into equivalent path delays at the base mode voltage. The method also comprises determining, based at least on the equivalent path delays, a constraint set expected to be hardest to meet during circuit synthesis and providing for synthesizing the integrated circuit with constraints based on the determined constraint set.

Any method according to any of these aspects or other aspects disclosed herein may be embodied in whole or in part in computer instructions available from computer readable media.

Still further aspects include a system for synthesis of dynamic voltage and frequency scaling integrated circuits. The system comprises an input configured for receiving a plurality of constraint sets, where each constraint set comprises a voltage for operation and a maximum path delay at that voltage. The system also comprises an input configured for receiving a description of a circuit to be synthesized subject to each of the plurality of constraint sets, and a processing resource configured for selecting a voltage of one of the constraint sets as a base voltage. The processing resource also is configured for translating maximum path delays for other constraint sets to reference the base voltage while maintaining approximate equivalency of synthesis difficulty for that constraint set, determining, based on the translated maximum path delays, which of the constraint sets will pose the most stringent constraints during synthesis, and providing for first synthesis of the circuit to meet those constraints.

BRIEF DESCRIPTION OF THE DRAWINGS

For a fuller understanding of aspects and examples disclosed herein, reference is made to the accompanying drawings in the following description.

DETAILED DESCRIPTION

The following description is presented to enable a person of ordinary skill in the art to make and use various aspects of the inventions. Descriptions of specific techniques, and applications are provided only as examples. Various modifications to the examples described herein will be readily apparent to those skilled in the art, and the general principles defined herein may be applied to other examples and applications without departing from the spirit and scope of the inventions.

Synthesis describes a design flow for producing a detailed design, e.g., a netlist, from a circuit description, such as a description posed in Register Transfer Language (RTL) or High Level Description Language (HDL) or other functionally equivalent ways to specify a functional operation of a circuit that can be used to determine a physical realization of it. Synthesis proceeds according to constraints that specify performance requirements for the resulting physical realization. Constraints can be specified and/or stored in any of a variety of ways, such as by manual inputs to a tool, a human editable text file parsed for use by a synthesis tool, or maintained in a database, or the like. Constraints may also be specified according to formats specified by standards, such as the Common Power Format standard, or another standard allowing specification of operating voltages and frequencies at which a circuit being designed should be able to operate.

A DVFS chip design can vary its voltage/frequency (V/F) operating point in the field, allowing adjustment of power consumption based on current workload. Therefore, DVFS is a useful technique to conserve power in a chip used to perform a range of tasks with a range of performance requirements at different points in time. For example, a chip in a digital camera may perform still image compression, still image decompression, video compression, and video decompression at various times, depending upon the function chosen by the user. Thus, when performing still image decompression, the V/F operating point can be a lower V/F, as such a task generally requires less performance than video decompression, for example. In such cases, when operating at low frequencies, the circuit or chip supply voltage can be decreased to reduce power consumption. A selection of V/F operating points can be made on the basis of what tasks a given circuit may need to perform. In such cases, for each task the design is desired or capable of performing, the required frequency of operation can be estimated by executing the task on a system-level model of the chip. The tasks the chip is expected to perform can also known be known as "modes" of operation. Other considerations can include whether the circuit has a source of AC power, a current state of battery charge and other considerations related to power availability and/or consumption.

A problem in DVFS synthesis is that meeting timing at any one operating mode does not guarantee that the circuit can operate at each other mode, without more information about the relative difficulties of meeting constraints for each mode. Also, it is helpful to perform a first synthesis of a circuit based on the most difficult to synthesize operating mode. Although designs can be and are incrementally changed or modified after an initial synthesis in order to meet other V/F combinations, constraints of a mode used during an initial synthesis can result in design choices that have effects which are difficult to overcome by incremental changes if constraints for an easier-to-synthesize mode were used instead of a harder-to-synthesize mode.

Some of these synthesis choices made during an initial synthesis for a first mode can include datapath architecture selection and structuring, which can have a large effect on the final netlist structure and Quality of Results (QoR). Such important structural choices may cause problems at other V/F operating points that cannot be solved with only incremental optimizations. For example, if area efficient structures were used for a particular path during initial synthesis, changing those structures to performance optimized structures may not be possible without having to rework neighboring portions of the circuitry. So, unless the designer guesses right, a manual iterative flow can require many iterations of synthesis and analysis, with a greater possibility of error, sub-optimal results, as well as wasted time. Also, approaching synthesis of the circuit by making constraints artificially stricter than may be necessary also may negatively affect the produced circuit, by sub-optimal power consumption and area metrics, for example.

A performance requirement for each V/F operating point can be expressed using standard timing constraints (e.g., in a Common Power Format (CPF) (by Si2, www.si2.org) file, or an SDC file). Hence, for each operating point, there can be a tuple of (voltage, constraints) (or more broadly, some finite number of constraints associated with a particular operating voltage, or still more broadly, a set of constraints of any nature sufficient to constraint a synthesis tool during synthesis). Synthesis, then, for a DVFS design ideally should produce a netlist from a functional specification that can meet all the constraints for each operating mode.

Figure 1:
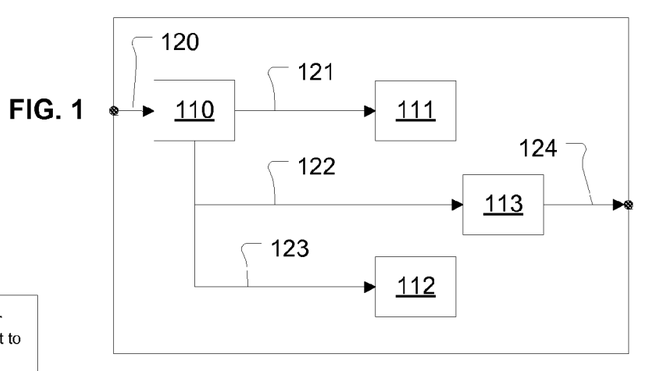
FIG. 1 illustrates a circuit composed of blocks, which can be the subject of synthesis and control thereof according to aspects disclosed herein.

For use in providing more particular examples, FIG. 1 illustrates a circuit 100 having circuit elements 110, 111, 112, and 113. For purposes of example, these circuit elements can be considered blocks of combinatorial logic, with latched inputs and/or outputs. Circuit elements 110 and 111 are connected by a path 121, circuit elements 110 and 113 are connected by a path 122, circuit elements 110 and 112 are connected by a path 123. Path 120 leads from an input to circuit 100 and path 124 leads to an output from circuit 100. Each of these elements may be synthesized separately and integrated or may be flattened and synthesized. Regardless, a relevant example is that latch to latch delays in circuit 100 would generally be subject to constraints imposed during synthesis (or if synthesizing for some other type of logic, e.g., asynchronous logic, a different sort of timing constraint may be imposed, such as a constraint imposed with respect to another input to a next logic function). For example, where outputs of elements 110-113 are latched, path 122 would need to propagate a signal and combinatorial logic in element 113 would need to finish such that an output could be latched prior to an end of a clock period used as a timing constraint (e.g., a maximum delay).

In a multimode deign (e.g., a DVFS design), a timing constraint and voltage of operation can be specified for each mode of operation. For example, JPEG decoding, JPEG encoding, and MPEG decoding can be different modes of operation. Initial simulations and characterizations, e.g., an architecture model, can be used to estimate processing rates for a given algorithm. Given the arrangement and number of functional units and the instructions available for controlling them, it may be determined that the target frequency and operating voltage for each of the three modes is approximately:

TABLE 1

| Task | Frequency | Voltage |
| --- | --- | --- |
| JPEG decoding | 75 MHz | 0.8 V |
| JPEG encoding | 100 MHz | 0.9 V |
| MPEG decoding | 200 MHz | 1.1 V |

To achieve timing closure in circuit 100 on all modes quickly, the first pass of synthesis ordinarily should be done on the mode that is hardest to synthesize so that power of early transforms such as structuring and datapath architecture selection can be brought to bear.

But, it is not always apparent which mode's constraints are the hardest to satisfy. If the voltages were the same, then it may be enough to only consider the target frequency to decide which mode's constraints are the hardest, since the mode with the highest target frequency would be the hardest to synthesize, the mode with the next highest target frequency is the next hardest, and so on. However, for DVFS designs, considering only the target frequency is insufficient, because the voltages for each mode are also different, and transistor switching speeds decrease as supply voltage decreases, such that a certain operating point might be harder to synthesize even if it has a lower target frequency.

For example, finding a reasonable synthesis solution to run at 100 MHz at 1.0v may be considerably easier than finding a synthesis solution for running at 75 MHz at 0.8v. In this example, if manually iterating synthesis for this dual voltage design, the quality of the final netlist (e.g, measured by delay (generally, the timing margin in the most critical path), area required, and power) may be adversely affected if the first synthesis is performed to achieve 100 MHz at 1.0V. Such a sub-optimal result accrues because transformations, such as restructuring, and architecture selection for datapath elements are performed only in the first synthesis, and thus, the harder problem of 75 MHz operation at 0.8V did not control these major decisions, rather than easier to meet operating point of 100 MHz at 1.0V did. Subsequent incremental optimization iterations use local optimizations to improve timing and area, but it may be difficult to use these incremental optimizations to compensate for large sub-optimalities introduced by a wrong choice of initial operating point for synthesis.

Equivalent Constraints

In the above example, if there existed a method to reduce a number of variables present among all the constraint sets provided for the operating modes, such that each mode can be compared based on relative values of one type of constraint. In the above example, each timing constraint is posed at a different voltage constraint, and therefore, constraints for each mode are not directly comparable. Thus if the voltage for each operating frequency constraint can be made equal, then by comparing the relative frequency values, a relative constraint difficulty can be estimated. The first synthesis could be done at this mode, and hence an iterative synthesis approach would be expected to converge more reliably and faster for the other mode(s).

As introduced above, for any given voltage/constraint association (e.g., a voltage/constraint pair (v, c,), the constraints can specify conditions necessary for operation at voltage v. Similarly, another voltage/constraint association (e.g., voltage/constraint pair (v1, c1)) can specify conditions c1 necessary for operation at voltage v1. Without more, the conditions c do not necessarily "guarantee" (i.e., in the mathematical sense, there is no statement of sufficiency) that the design can operate at voltage v1 and similarly, conditions c1 do not necessarily guarantee that the design can operate at voltage v. Moreover, given that c1 and c are specified at different voltages, it not necessarily apparent which of these constraints poses a more difficult synthesis problem.

Thus, one aspect disclosed herein provides for these constraints to be specified at a common voltage, such that the difficulty that each constraint poses in synthesis can be determined more easily and/or automatically. Converting an original constraint posed at v into a constraint posed at v1, while at least approximately maintaining the same synthesis difficulty can be described as identifying a constraint equivalent to a value of the original constraint but referenced to voltage v1.

One way to formulate equivalent constraints according to aspects disclosed herein can involve determining an equivalent clock period for each original constraint clock period, as referenced to a base mode operating voltage (where a clock period is specified, a clock frequency can also be used to express that concept). For example, a clock period of 100 MHz at 1.0V can have an equivalent clock period of 120 MHz at 1.1V and another equivalent clock period of 60 MHz at 0.8V. Viewed from one aspect, a time to propagate a critical path signal at one voltage can be mapped, associated, or otherwise determined to be equivalent (at least in the sense of a design approximation) to a propagation delay time on that path at another operating voltage.

An exemplary method to derive equivalent constraints for a given (voltage, constraint) pair, is presented below. This method involves translation of a constraint provided at one voltage to an equivalent constraint at another desired voltage (i.e., given (v1, c1) and v2, a c2 is determined through translation) with the method.

Generally, a signal needs to propagate from an output to its next input within a period of time defined by a clock operating at a clock frequency (or some amount less than the clock, as determined by setup margins, and other considerations known in the art). Therefore, a maximum permissible path delay can also be expressed in terms of a maximum operating frequency. The following method is developed in terms of delay and related to frequency as appropriate. A model for the gate delay (i.e., an estimate for the on/off switching time) of a basic gate is:

$$D = k \frac{V_{dd}}{(V_{dd} - V_t)^a}. \quad \text{Equation (1)}$$

In Equation (1), D is the gate delay. $V_{dd}$ is the supply voltage and $V_t$ is the threshold voltage of the transistors in the gate. k is a parameter that does not change when supply voltage changes, i.e., k depends only on the physical characteristics of the gate such as width, height, capacitance of the gate oxide layer, etc. Thus, none of the characteristics that influence the value of k change with supply voltage change or otherwise include supply voltage as a factor. Therefore, k does not affect relative gate delays between operating voltages.

The exponent a is a process parameter that can vary from approximately 1.3 to approximately 2.0 in current processes. a depends on the feature size of the process (e.g., whether it is 250 nm process or a 90 nm process). However, conventionally it is assumed to be 2.0. In one aspect herein, it has been found that such an assumption regarding a results in suboptimal or unacceptable results in translation of delays and derivation of equivalent constraints according to aspects disclosed herein. For example, some experimental results relating to the provision of a more accurate value for a are provided below.

With the above expression for gate delay, the known constant k, and assuming a constant threshold voltage, $V_t$, gate delay $D_1$ at a first operating voltage $V_{dd1}$ can be determined, as expressed in equation (2).

$$D_1 = k \frac{V_{dd1}}{(V_{dd1} - V_t)^a} \quad \text{Equation (2)}$$

Similarly, a gate delay $D_2$ can be expressed in terms of its operating voltage $V_{dd2}$ with the remaining parameters the same, as expressed in equation (3). Then, a ratio for gate delays $D_1$ and $D_2$ can be expressed based on Equation (2) and (3), and is provided as equation (4), removing the parameter k by cancellation.

$$D_2 = k \frac{V_{dd2}}{(V_{dd2} - V_t)^a} \qquad \text{Equation (3)}$$

$$D_2 = D_1 \left(\frac{V_{dd2}}{V_{dd1}}\right)\left(\frac{V_{dd1} - V_t}{V_{dd2} - V_t}\right)^a \qquad \text{Equation (4)}$$

(In practice, $V_{dd2} \neq V_t$, since otherwise, the transistor would not switch—i.e., delay is infinity.)

Every term in the product on the right hand side of Equation (4), other than the known quantity $D_1$, is independent of any particular path in the circuit. In other words, only $D_1$ relates to the particular portion of a circuit being synthesized or characterized.

$$\text{So,} \left(\frac{V_{dd2}}{V_{dd1}}\right)\left(\frac{V_{dd1} - V_t}{V_{dd2} - V_t}\right)^a$$

can be considered a parameter $T_{nq}$ that can be computed once for each pair of modes, for which operating voltages differ (e.g., $T_{1,2}$ is the parameter for mode 1 and mode 2, to which $D_1$ and $D_2$ respectively correspond).

For the purposes of the present explanation, a difference in path delay between different operating frequencies is assumed to be caused solely by differences in gate delay caused by the voltage difference. In other words, any difference in delay caused by differences in signal propagation on interconnect is considered negligible compared to switching delay differences. Thus, a ratio of switching delays, as expressed in Equation (4) also provides a path delay ratio approximation. Of course, in other implementations, an approximation of signal propagation delay differences may also be included in a path delay ratio approximation. For example, on some paths, SPICE simulations may be conducted to determine propagation delay differences as operation frequency and voltage varies. An approximation of effects induced thereby may be developed based on such data, or based on a reasoned estimate of the effect of such voltage/frequency variation.

However, for this example, when considering a given path, its delay at a given operating voltage is estimated by multiplying a known path delay at a different operating voltage with the appropriate T parameter for those two operating voltages. Because this T parameter need not be recalculated on a path by path basis, this procedure is relatively fast and can be applied easily to a large number of paths in a given design.

With a way to estimate path delays for different operating voltages in a given path, a way to arrive at equivalent constraints is explained using an example.

An example design can have a clock constraint specifying a clock with period p Picoseconds (ps) at operating voltage $V_{dd1}$. The synthesis tool would satisfy this constraint when synthesizing a circuit according to the logical specification and the constraints by ensuring that a path delay of every timing path in the synthesized design is no greater than p ps when the design is operated at $V_{dd1}$ (note that the constraint of p ps can include a guardband margin, or the tool can otherwise build one in to the specified timing constraint, so the tool may not synthesize precisely to a p ps delay). This process usually proceeds based on timing analysis of a critical path signal.

Now, if the designer also wishes to operate the synthesized design at voltage $V_{dd2}$, an acceptable timing constraint must also be obtained (i.e., the tool also needs to ensure that a critical path delay is not longer than a clock period achievable or desired at that voltage). Based on a known operating clock frequency at $V_{dd1}$, there must be some clock frequency for operation at $V_{dd2}$ that provides a delay on a critical path equivalent to that of the delay at $V_{dd1}$. This equivalent clock period to be determined is called eq_p.

Considering the critical path(s), there will be a clock frequency at which an actual signal delay at voltage $V_{dd2}$ (delay_vdd2) in the critical path(s) is just under the available period of time for signal propagation provided by the clock period. Thus, setting delay_vdd2 equal to the equivalent clock period eq_p establishes equivalency between the $V_{dd1}$ and $V_{dd2}$ operating modes, because eq_p is, by definition, the clock period for $V_{dd2}$.

Thus, solving for $\text{delay}_{vdd2}$ using Equation 4 (based on a known delay at $V_{dd1}$, provides the equivalent clock period eq_p for operation at $V_{dd2}$. This methodology would provide a timing constraint where timing would be expected to be "just met", which generally results in an implementation with the least area and power. However, within the above disclosures is selecting a maximum delay period and/or maximum clock frequency less than the maximums provided by setting the delay equal to the clock period. In other words, a guardband or some difference may be provided here as well.

The above description demonstrates that a clock constraint for one voltage can be obtained based on a clock constraint provided at another voltage by multiplying the clock period of the given clock by the T parameter for those two operating voltages, which interrelates the delays for those respective operating voltages (as previously addressed, path delays are assumed to be due solely to transistor switching, and thus, path delays scale with transistor switch time scaling, as expressed in Equation (4).

The above development implicitly provides that a gate delay during switching is symmetrical, or that there was a selection as to whether a high to low or a low to high transition was to represent a given gate delay. Other implementations can separately estimate high to low and low to high transitions, performing the same method or similar method for each type of transition. Different types of logic can be comprehended in these calculations, for example, a pre-charge circuit can affect transition timings. Nevertheless, the method can be applied so long as one voltage's delays can be determined, estimated, or assigned.

Figure 2:
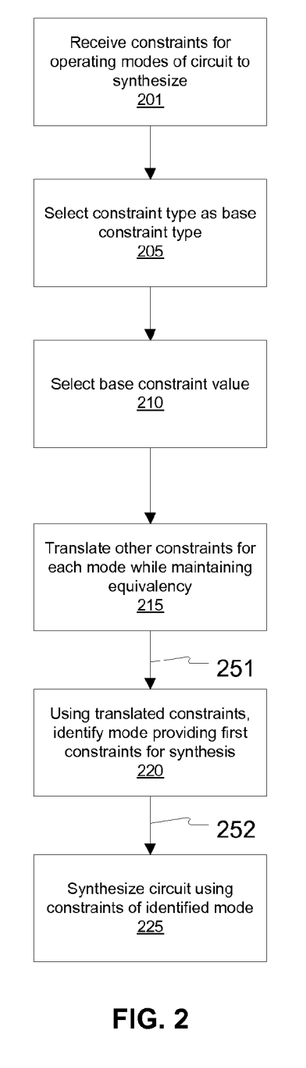
FIG. 2 illustrates steps of a method for selecting constraints to be used in a first synthesis of a DVFS circuit.

A method 200 of FIG. 2 illustrates exemplary steps for a method according to the above description, where a respective constraint for each mode of operation is specified as a tuple of voltage and maximum delay. A system (e.g., system 400 of FIG. 4) receives (201) constraints relating to desired operating modes at which a circuit definition is to be synthesized into a physical realization. As disclosed above, these constraints can be obtained in a variety of ways, such as input from a CPF file or SDC file. The system 400 can select (205) a constraint type for use as a base constraint type. This example relates to using voltage as a base constraint type. The system selects (210) a voltage as a base voltage value in this voltage-type base mode constraint example. This voltage can be a voltage provided in one of the constraints for one of the modes (e.g., 0.8v corresponding to the JPEG decoding mode of Table 1, above), or another voltage.

For any mode's constraint not referenced to this selected base voltage, the original value for the delay associated with those constraints is translated (215) by use of equation 4 to be referenced to the base voltage, where $D_1$ is the original delay value for the mode's constraint, referenced to $V_{dd1}$, and $D_2$ is the translated value for the delay referenced to $V_{dd2}$. Note that if one of the constraint's voltages was selected as the base voltage, then that constraint's delay value need not be translated, as it already is with respect to the base voltage. Then, based on the translated constraints, now all referenced to the same base voltage, a mode can be selected (220) for providing constraints during synthesis. The circuit can then be synthesized (225) according to known methods using the constraints of the selected mode (either as translated or as originally presented).

The selection can be based on an explicit translation into an operating frequency. For example, suppose that a synthesized circuit is to satisfy two sets of constraints: 100 MHz at 1.0V, and 75 MHz at 0.8v. Further assume a=1.6, and $V_t$=0.25.

Then, if 0.8v is selected as a base mode voltage, 100 MHz is to be translated into an equivalent constraint at that base mode voltage, 0.8v. This may be accomplished by converting 100 MHz to a 10 ns clock period, and plugging values into $$D_2 = D_1 \left(\frac{V_{dd2}}{V_{dd1}}\right)\left(\frac{V_{dd1} - V_t}{V_{dd2} - V_t}\right)^a = \qquad \text{Equation (4)}$$

$$10 \text{ ns} \left(\frac{0.8}{1.0}\right)\left(\frac{1.0 - 0.25}{0.8 - 0.25}\right)^{1.6} \approx 13.1 \text{ ns}$$

or 76.1 MHz. Because it would be at least marginally more difficult to synthesize a circuit to operate at 76.1 MHz versus 75 MHz at any given voltage (here, a voltage of 0.8v), it can be determined that synthesizing the circuit to meet 100 MHz at 1.0v is expected to be slightly more difficult than synthesizing the circuit to meet 75 MHz at 0.8v.

Alternatively, the 75 MHz at 0.8v could be translated into a base mode of $$1.0 \text{ v}. \ D_2 = 13.33 \left(\frac{1.0}{0.8}\right)\left(\frac{0.8 - V_t}{1.0 - V_t}\right)^a = 10.144 \text{ ns or } 98.58 \text{ MHz},$$

which again shows that the 75 MHz at 0.8v is expected to be slightly easier to synthesize.

Ranking of Operating Modes

Figure 3:
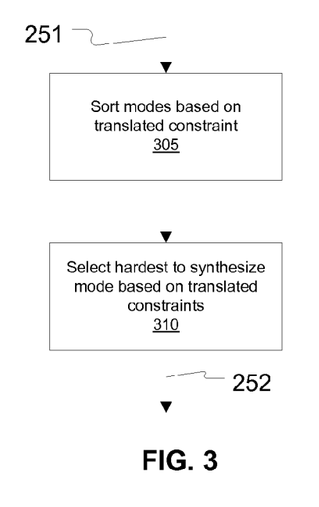
FIG. 3 illustrates examples steps for selecting the constraints for the first synthesis of the method of FIG. 2.

As described with respect to step 220, above, a mode can be selected based on the translated constraints. In some aspects, the modes can be ranked or sorted according to the translated constraints. For example, after step 215, identified as element 251 in FIG. 2 and in FIG. 3, the modes can be sorted based on values of the translated constraints. For example, with respect to Table 1, the modes can be sorted or ranked in order of increasing difficulty by sorting the modes into an ascending translated frequency of operation (note that delay and frequency are used interchangeably here, as they are inverses in the sense that the translated delay provides a maximum clock period, which in turn translates to a frequency). Then, in 310, the mode that is ranked hardest to synthesize can be selected or identified (220 of FIG. 2) for use in synthesis (225 of FIG. 2). The synthesis can be performed automatically in response to identifying the hardest to synthesize mode, or the method can also be used as an aid to a designer in determining a mode to first synthesize. The following numbers are hypothetical and are not necessarily indicative of outputs from the above-described methods and other procedures.

To rank the modes by difficulty of synthesis, one of the operating voltages may be selected as a base mode voltage.

For constraints pertaining to other modes, constraints equivalent to the constraints as originally specified (i.e., with respect to their original voltages) are determined to reference the base mode voltage. As such, the equivalent constraints are with respect to a common base mode voltage, and sorting the constraints by target frequency provides a ranking of difficulty to synthesize the circuit for the desired operating modes.

In the particular example of Table 1, the process of sorting or ranking the modes can result, for example, in the ordering of Table 2, below. Since the voltages are the same for the computed equivalent frequencies, the voltage can be ignored and the computed equivalent frequencies can be compared to determined a hardest mode to synthesize. In this particular hypothetical, the MPEG decoding mode whose equivalent target frequency of 85 MHz is the hardest to synthesize. That is, 200 MHz at 1.1V can be determined to be harder to achieve in a synthesized design than 100 MHz at 0.9V or 75 MHz at 0.8V. JPEG encoding, a higher frequency and higher voltage mode was determined an easier constraint to meet in synthesis than those of the JPEG decoding mode. The following numbers are an example, and particular results would depend on selection of a particular threshold voltage and parameter a.

TABLE 2

| Mode | Frequency (given) | Voltage | Equivalent Freq (computed) | Base Voltage |
|---|---|---|---|---|
| JPEG encoding | 100 MHz | 0.9 V | 60 MHz | 0.8 V |
| JPEG decoding | 75 MHz | 0.8 V | 75 MHz | 0.8 V |
| MPEG decoding | 200 MHz | 1.1 V | 85 MHz | 0.8 V |

In view of these disclosures, similar procedure(s) can be derived or implemented for handling other timing constraints as well as exceptions to machine generated delay values. For example, multiply user-supplied delay values can be factored into procedures, as well as used to derive scaling factors to be applied to other paths.

Equation (4), which is used to arrive at the translated values for the constraints depends on $V_t$ and the parameter a. Even more particularly, the translated values depend exponentially on the parameter a. Therefore, accuracy of results can depends on accurate estimations for $V_t$ and a. It may be preferred to provide an estimate for a and/or $V_t$ based on a particular process or simulations for a particular process; however, such preference is not to the exclusion of using any a and/or $V_t$ values deemed appropriate in a particular circumstance.

Procedure to Estimate $V_t$ and a

It was described above that it is conventional to assume that the parameter a is 2.0 for synthesis. It has been found that this assumption is not as accurate as would generally be preferable for aspects disclosed herein. The following describes how threshold voltage $V_t$ and a can be estimated from a library of cells characterized at voltages Vdd1 and Vdd2.

Figure 4:
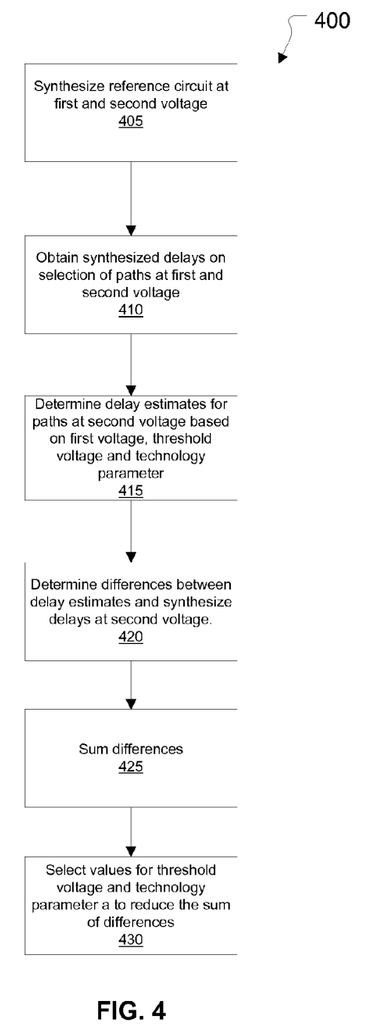
FIG. 4 illustrates steps of a method for calculating parameters used in translating constraints as provided in the method of FIG. 2.

A reference circuit, which can be specified, for example, as an RTL-level representation, can be used. This reference circuit is synthesized to a fastest implementation at voltage Vdd1 and at voltage Vdd2 (405), i.e., the reference circuit is synthesized twice—once for each voltage. Practically, the fastest implementation can be invoked in synthesis tools by clocking the circuit with a single clock with an infinitesimally small period and invoking synthesis, because the synthesis tool would then use available speed increasing optimizations when making choices concerning how the circuit is to be synthesized.

Next, for an exemplary or a selected or a sampled selection of paths, respective path delays can be calculated (410) for each of the synthesized designs (i.e., delays for each circuit resulting from synthesis at Vdd1 and at Vdd2). Standard static timing analysis can be used for such calculations. The above steps result in a synthesis-driven timing for each path of interest at two different voltages, Vdd1 and Vdd2.

For each path, for any values that Vt and a take (i.e., allowing Vt and a to vary freely), an estimated path delay at Vdd2 can be calculated with equation (4) using the path delay for Vdd1 as $D_1$ (415).

$$\text{est\_path\_delay}_{vdd2}(V_t, a) = \text{synth\_path\_delay}_{vdd1}\left(\frac{V_{dd1}}{V_{dd2}}\right)\left(\frac{V_{dd1} - V_t}{V_{dd2} - V_t}\right)^a$$

Then, this estimated path delay can be compared (420) with the delay found during static timing analysis described above. In a particular implementation, an estimation error for the path delay at Vdd2 can be found as a ratio:

$$\text{estimation\_error}(V_t, a) = \left(\frac{\text{abs}(\text{synth\_path\_delay}_{vdd2} - \text{est\_path\_delay}_2)}{\text{synth\_path\_delay}_{vdd2}}\right)$$

Then, this process can be repeated for other paths of interest (or for all paths, random paths, etc.) For all paths used, a total estimation error can thus be calculated (425) as:

$$\text{total\_estimation\_error}(V_t, a) = \Sigma \text{estimation\_error}(V_t, a)$$

After calculating (425) the total estimation error for all the paths, and for all combinations of Vt and a that are of interest, it is possible to pick the combination of Vt and a that has the lowest total estimation error for all the paths. This combination of threshold voltage and parameter a would be expected to most appropriate for predict the delay at $V_{dd2}$ based on the delay at $V_{dd1}$ as allowed for in equation 4 (in this example). Of course, a combination of Vt and a that simply reduces the error may also be beneficial, and in some cases, some combinations may be close enough to each other than the difference in results between them may be insignificant, and as such, no strict minimization is required to gain benefits from the procedure.

Figure 5:
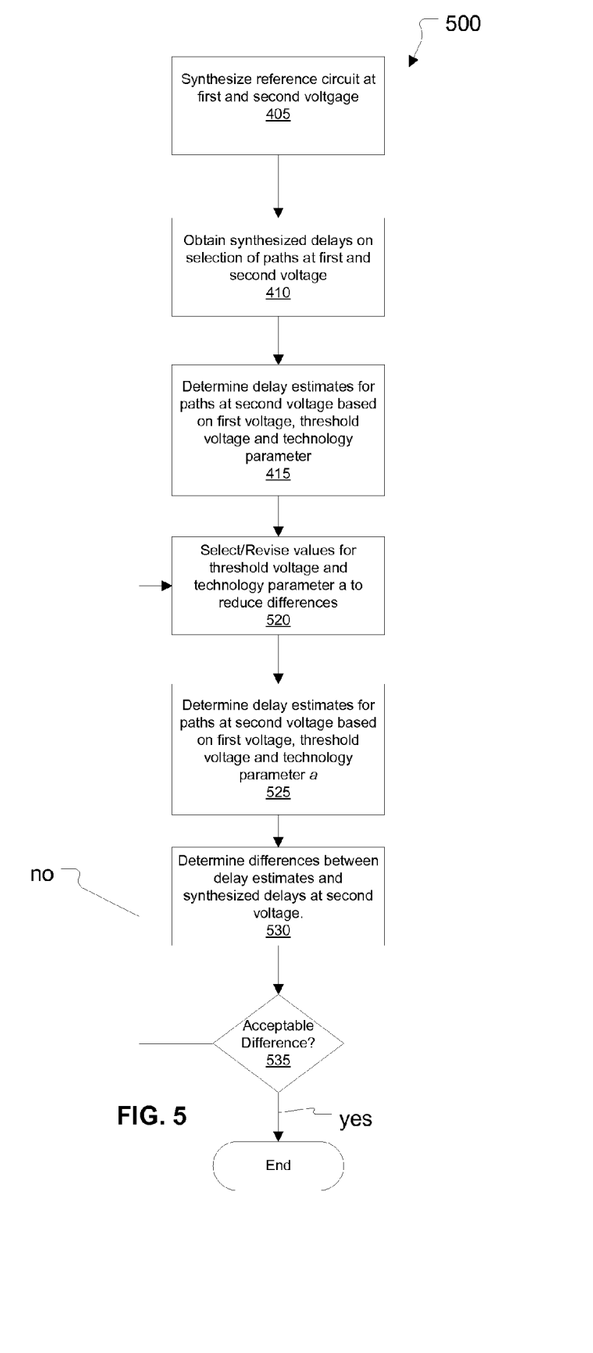
FIG. 5 illustrates steps of another method for calculating those parameters.

FIG. 5 illustrates another example procedure 500 to identify values for the parameter a and $V_t$. This procedure iteratively converges on such values. Steps 405, 410 and 415 are provided in the method 500 as well. Step 520 includes selecting (or revising, if arriving at step 520 from step 535), values for a and $V_t$. Path delays at the second voltage are estimated (525) using equation (4) based on the values for a and $V_t$. Differences between the estimated and synthesis delays are determined (530) and if the difference is acceptable, then the estimates of the values of a and $V_t$ are acceptable. Otherwise, the method returns to step 520 to select other estimates for a and $V_t$. Acceptable differences can vary with the application and the degree of accuracy required or desired; for example, differences of less than 5% may be acceptable in some applications, while 1% differences might be required elsewhere. For any of the methods herein, the ordering of the steps in the method does not imply necessarily such an arrangement of steps. For example, obtaining synthesized path delays at the second voltage can be done separately from doing so for the first voltage, and can be done after determining delay estimates for path delays at the second voltage, based on equation (4), for example.

Since the range of possible values for a and $V_t$ is reasonably small, such a procedure may be converge with acceptable speed to acceptable values for a and $V_t$. In other words, guesses as to appropriate values for a and $V_t$ can be made based on intermediate error estimates, and even prior to completely analyzing all paths delays for each combination. In other words, if a given combination is resulting in unacceptable errors, then that combination may be ruled out prior to completion of all paths, in favor of another potential combination.

Since the threshold voltage and exponent are technology parameters that are common to all library cells, these values can be used to estimate the path delays in any other design that will be synthesized with this library.

The table below provides results of applying the delay scaling methodology described above to designs (DLX__13TT and ALU__13TT) using a low-voltage library, proving that benefits accrue from using the above method to determine a more accurately than the value presently assumed. The first row for each design provides an example estimated a and a percentage error based on a method according to the above-examples. The second row shows the average error in estimation when an exponent value of 2.0 is used.

TABLE 3

| Design__Library | Vdd1 (V) | Vdd2 (V) | Value of α | % error in path delay est. |
|---|---|---|---|---|
| DLX__13TT | 0.4 | 1.0 | 1.665 | 11.80% |
| DLX__13TT | 0.4 | 1.0 | 2.0 | 41.0% |
| ALU__13TT | 0.4 | 1.0 | 1.66 | 2.2% |
| ALU__13TT | 0.4 | 1.0 | 2.0 | 48% |

The following pseudocode examples illustrate examples of function calls and other ways that the methods can be implemented. These pseuocode examples may be stored on computer readable media and may be stored compiled or written in a particular language, or any of a variety of other means for conveying information in a form than can be read by a computer for obtraining instructions for executing a method.

One function can be an estimate delay function call. For example, this estimate delay function call is based on equation (4), and receives $D_1$, $V_{dd1}$, $V_{dd2}$, $V_t$ and a and returns $D_2$ (i.e., delay at $V_{dd2}$).

estimate_delay ($D_1$, $V_{dd1}$, $V_{dd2}$, $V_t$, $D_2$, $V_t$, a):

$$D_2 = D_1\left(\frac{V_{dd2}}{V_{dd1}}\right)\left(\frac{V_{dd1} - V_t}{V_{dd2} - V_t}\right)^a; \text{ return } d2.$$

The following example pseudocode procedure exemplifies estimation of a total error present in estimates for $V_t$ and a based on synthesis at $V_{dd1}$ and $V_{dd2}$ for primary output paths.

```
calculate_total_error(vt, α):   bind_design_to_voltage(V_dd1)
                                    foreach primary output p_o:
                                        d_1(p_o) = path_delay(p_o)
                                    bind_design_to_voltage(V_dd2)
                                    foreach primary output p_o:
                                        d_2(p_o) = path_delay(p_o)
                                    foreach primary output p_o:
                                        est_d2(p_o) = estimate_delay(d_1, V_dd1,
                                            V_dd2, V_t, α)
                                        est_error = abs(est_d2(p_o) - d2(p_o))
                                        tot_est_error += est_error
```

```
                      return tot_est_error
                      end proc /* calculate_total_error */
estimate_vt_and_a:    for V_t = 0.1 to 0.5 step 0.05
                        for α = 1.3 to 2.0 step 0.05
                          total_error = calculate_total_error(V_t,
                          α)
                          if total_error < min_total_error:
                            rsl_vt = V_t
                            rsl_a = α
                            min_total_error = total_error
                          endif
                        endfor /* a */
                      endfor /* vt */
                      return (V_t, α)
```

For each mode (operating point or constraint set), equivalent constraints can be derived that are referenced to the voltage of a base mode while maintaining consistency and accuracy relating to an available time for signal propagation at each mode. Constraints usually specify a minimum clock frequency (or a maximum delay) and as originally posed by a designer, are valid at a corresponding voltage.

By converting the constraints of each mode to be specified from a common voltage, the most difficult mode to synthesize can be selected automatically based on frequency comparisons. Then, the design can be synthesized to that mode directly. Since the other modes, when translated to their equivalent constraints, would be at the same voltage, the synthesized design would be able to accommodate a slower clock at the same voltage. Verification can be performed for each equivalent constraint set to ensure that the mode operates.

The above-described examples and aspects generally related to translating frequency (delay) constraints to a base voltage. However, from the mathematical relationships disclosed above, it is apparent that a base frequency or delay could also be selected, and voltages could then be translated to maintain equivalency of each voltage/frequency constraint pair, a "hardest" to synthesize equivalent constraint would be selectable by reference to the translated voltages, and the constraint set to which that voltage was associated would then be used for synthesis.

Figure 6:
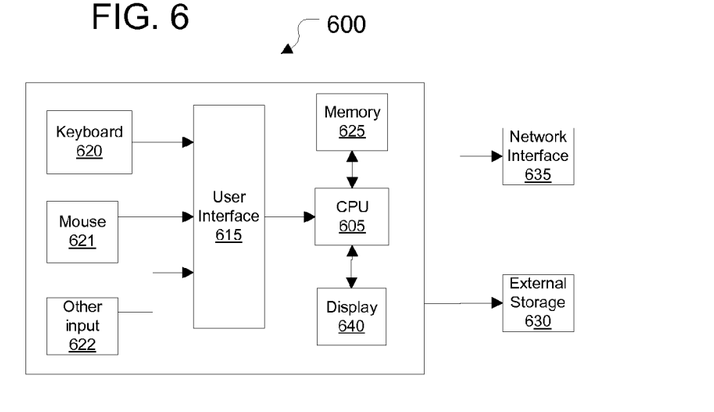
FIG. 6 illustrates a system in which any of these methods may be practiced.

All of the above-described methods and other aspects can be implemented in systems configured by computer readable media or otherwise storing instructions or operable to perform the functions. System 600 provides an example of such a system, and includes a user interface 615 comprising a keyboard 620, a mouse 621, and any other input device necessary or desirable (represented as 622). The user interface 615 communicates with a CPU 605 (which can itself be composed of a number of components, such as main processor core, and a chipset handling memory and other I/O operations). The CPU communicates with a memory 625 (e.g., DRAM) and a display 640. The system 600 may also communicate with any form of external storage 630, such as a CD or DVD ROM or RW drive, a USB-based flash drive, a floppy disk, or the like. System 600 may also communicate via a network interface 635. Receipt of information over the network interface 635 also is within the scope of receiving data and/or instructions via a computer readable medium.

Figure 7:
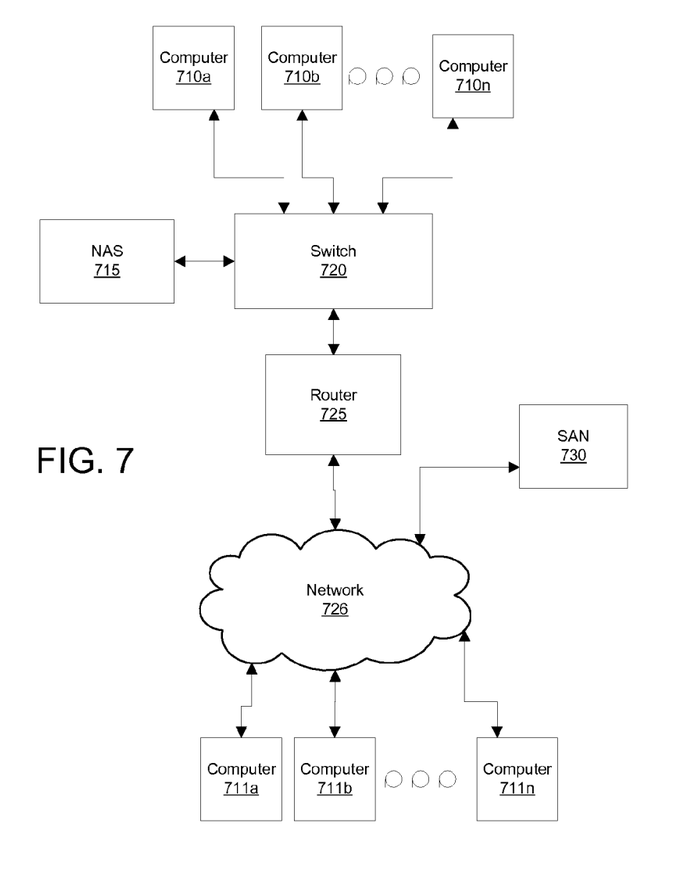
FIG. 7 illustrates a network in which systems according to FIG. 6 may be used.

System 600 can also be used as a portion of a larger network-based synthesis solution 700. Solution 700 can comprise a plurality of systems 500 represented as computers 710a-710n and located at a first site and connected to a switch 720. Switch 720 can also be connected to Network Attached Storage 715 and to router 725. Router 725 provides an internetwork connection to Storage Area Network 730, and to computers 711a-711n that can be distributed various logical and/or physical networks. The computing resources 711a-711n and 710a-710n can be used in performing synthesis on portions of a circuit design based on libraries and source code or binaries stored and/or distributed through and among the components of solution 700.

I claim:

1. A computer readable medium storing computer executable instructions for a method useful in synthesis of an integrated circuit, the method comprising: using a computer to:
   receiving a constraint set for each mode at which a circuit to be synthesized is expected to be operable, each constraint set including a voltage and a frequency corresponding to that voltage;
   selecting a voltage as a base mode voltage;
   translating frequencies corresponding to voltages different from the base mode voltage into equivalent frequencies, each corresponding to the base mode voltage, and indicative of the relative difficulty to synthesize the circuit to be operable within each constraint set; and
   based at least in part on the equivalent frequencies, selecting a constraint set for use in a first synthesis of the circuit.

2. The computer readable medium of claim 1, wherein the frequencies are expressed as maximum delays, a frequency ($D_1$) of a first constraint set corresponds to a voltage ($V_1$), and is translated to an equivalent frequency corresponding to the base mode voltage by a scaling factor $$D_1 \left(\frac{V_2}{V_1}\right)\left(\frac{V_1 - V_t}{V_2 - V_t}\right)^a,$$

where $V_2$ is the base mode voltage, $V_t$ is a threshold voltage for synthesis library cells used in the synthesis, and a is a technology parameter.

3. The computer readable medium of claim 2, wherein the technology parameter a has a value less than 2.0.

4. The computer readable medium of claim 2, wherein the parameter a is estimated by synthesizing a reference circuit for minimum path delay in operation at a first reference voltage ($V_{ref1}$) and at a second reference voltage ($V_{ref2}$), $V_{ref2} \neq V_{ref1}$, determining delays for a selection of paths in the reference circuit for operation at each of $V_{ref1}$ and $V_{ref2}$, translating respective determined delays ($D_1$), at $V_{ref1}$ operation, into respective translated delays ($D_2$), for $V_{ref2}$ operation, from using the relation $$D_2 = D_1 \left(\frac{V_2}{V_1}\right)\left(\frac{V_1 - V_t}{V_2 - V_t}\right)^a,$$

and seeking a value for the parameter a that reduces mismatch between $D_2$ and a determined delay for those paths determined through synthesis for operation at $V_{ref2}$.

5. The computer readable medium of claim 1, wherein the voltage selected as a base mode voltage is a voltage of one of the modes.

6. The computer readable medium of claim 1, wherein selecting the constraint set includes determining relative synthesis difficulty based on which of the equivalent frequencies is greatest.

7. A computer readable medium storing computer executable instructions for a method useful in synthesis of multi-mode integrated circuits, the method comprising: using a computer to:

identifying a first mode and a second mode for operation of an integrated circuit, each of the first mode and the second mode specified by a respective original constraint set comprising at least a first constraint with an original value and a second constraint with an original value;

determining a first constraint base value; and for each of the first and second modes with an original first constraint value different from the base value, determining a value for a respective second constraint equivalent that approximately represents, with respect to the first constraint base value, a synthesis constraint equivalent to that provided by the original values of the first constraint and the second constraint for that mode.

8. The computer readable medium of claim 7, wherein the original constraint set for each of the first mode and the second mode includes a voltage-based first constraint and a timing-based second constraint, and the original value for the voltage-based first constraint of the first mode is determined as the first constraint base value.

9. The computer readable medium of claim 7, wherein the first mode and the second mode are of a plurality of at least three modes of operation.

10. The computer readable medium of claim 7, wherein the method further comprises comparing the values of the respective second constraint equivalents to identify which of the first mode and the second mode is expected to be more difficult to synthesize.

11. The computer readable medium of claim 7, wherein first constraints of the first mode and the second mode are respective operating voltages, the operating voltage for the first mode different from that of the second mode, second constraints of the first and the second operating modes specify respective minimum operating frequencies, and the step of determining the second constraint value for each equivalent constraint set comprises determining an operating frequency of equivalent synthesis difficulty when the circuit is synthesized at the base value for the operating voltage of the first constraint.

12. The computer readable medium of claim 7, wherein the first constraint of the first mode is an operating voltage Vdd1 and the first constraint of the second mode is an operating voltage Vdd2, Vdd1≠Vdd2, the respective second constraints relate to respective maximum clock periods (D1 for the first mode and D2 for the second mode), the base value for each equivalent constraint set is selected as Vdd1, and the step of determining the value for the second constraint of the equivalent constraint set of the second mode includes determining that $$D_2 = D_1 \left(\frac{V_{dd2}}{V_{dd1}}\right)\left(\frac{V_{dd1} - V_t}{V_{dd2} - V_t}\right)^a,$$

where $V_t$ is a threshold transistor voltage for a synthesis library and a is a process technology dependent parameter.

13. The computer readable medium of claim 12, wherein the parameter a is estimated based on synthesizing a reference circuit for a fastest possible operation at two different voltages, translating one or more minimum path delays determined through synthesis at one of the voltages to estimated minimum path delays for those paths at the other voltage, using the relation $$D_2 = D_1 \left(\frac{V_{dd2}}{V_{dd1}}\right)\left(\frac{V_{dd1} - V_t}{V_{dd2} - V_t}\right)^a,$$

and seeking a value for the parameter a that reduces a mismatch between minimum path delays determined through synthesis and those estimated through the relation.

14. The computer readable medium of claim 12, wherein $V_t$ is estimated based on synthesizing a reference circuit for minimum path delay in operation at voltage $V_1$ and at voltage $V_2$, $V_2 \neq V_1$, determining delays for the same paths in each resulting synthesized reference circuit, translating a determined delay for the synthesized circuit for operation at $V_1$ (D1) to an estimated delay for the path for operation at $V_2$ ($D_2$), using the relation $$D_2 = D_1 \left(\frac{V_2}{V_1}\right)\left(\frac{V_1 - V_t}{V_2 - V_t}\right)^a,$$

and seeking a value for $V_t$ that reduces a mismatch between $D_2$ and a minimum delay for that path determined through synthesis for operation at $V_2$.

15. The computer readable medium of claim 12, wherein $V_t$ and the parameter a are estimated based on synthesizing a reference circuit for minimum path delay in operation at voltage $V_1$ and at voltage $V_2$, $V_2 \neq V_1$, determining delays for the same paths in each resulting synthesized reference circuit, translating a determined delay for the synthesized circuit for operation at $V_1$ (D1) to an estimated delay for the path for operation at $V_2$ ($D_2$), using the relation $$D_2 = D_1 \left(\frac{V_2}{V_1}\right)\left(\frac{V_1 - V_t}{V_2 - V_t}\right)^a,$$

and seeking value for $V_t$ and the parameter a that reduce a mismatch between $D_2$ and a minimum delay for that path determined through synthesis for operation at $V_2$.

16. A computer readable medium storing computer executable instructions for a method useful in synthesis of integrated circuits, the method comprising: using a computer to:

synthesizing a reference integrated circuit based on a component library and for operation at a first voltage and at a second voltage;

obtaining respective synthesized delays for each path of a selection of paths in the integrated circuit for circuit operation at each of the first voltage and at the second voltage;

determining, for the second voltage, delay estimates for each path of the selection of paths, based at least on the first voltage, a threshold voltage, and a technology-specific parameter a; and selecting values of one or more of the threshold voltage and the parameter a that reduce differences between delay estimates for the second voltage and synthesized delays for the second voltage.

17. The computer readable medium of claim 16, further comprising estimating differences between respective estimated delays for paths at the second voltage and synthesized delays for those paths at the second voltage; and summing the differences; wherein the selection of values of one or more of the threshold voltage and the parameter a is based on reducing the summation of the differences.

18. The computer readable medium of claim 17, wherein values of one or more of the threshold voltage and the parameter a that minimize the summation of the differences are selected.

19. A method for synthesis of multimode circuits comprising: using a computer to:

receiving sets of constraints for a plurality of operating modes, at which an integrated circuit to be synthesized is to operate, each constraint set including an operating voltage and a maximum path delay;

selecting one of the operating voltages as a base mode voltage;

translating the maximum path delays of any of the other constraint sets having a voltage different from the base mode voltage into equivalent path delays at the base mode voltage;

determining, based at least on the equivalent path delays, a constraint set expected to be hardest to meet during circuit synthesis; and providing for synthesizing the integrated circuit with constraints based on the determined constraint set.

20. The method of claim 19, wherein the base mode voltage is one of the operating voltages of one of the sets of constraints.

21. The method of claim 19, wherein the determining includes ranking the modes in order of synthesis difficulty based at least on the equivalent path delays.

22. The method of claim 19, wherein the maximum path delay are specified as respective clock periods.

23. The method of claim 19, wherein the maximum path delay are specified as respective clock frequencies.

24. A system for synthesis of dynamic voltage and frequency scaling integrated circuits, the system comprising:

an input configured for receiving a plurality of constraint sets, each constraint set comprising a voltage for operation and a maximum path delay at that voltage;

an input configured for receiving a description of a circuit to be synthesized subject to each of the plurality of constraint sets; and a processing resource configured for selecting a voltage of one of the constraint sets as a base voltage, translating maximum path delays for other constraint sets to reference the base voltage while maintaining approximate equivalency of synthesis difficulty for that constraint set, determining, based on the translated maximum path delays, which of the constraint sets will pose the most stringent constraints during synthesis, and providing for first synthesis of the circuit to meet those constraints.

* * * * *